United States Patent
Fleiner et al.

(10) Patent No.: US 7,783,832 B2
(45) Date of Patent: *Aug. 24, 2010

(54) SYSTEM AND METHOD FOR FAULT TOLERANT CONTROLLER FOR NETWORK RAID

(75) Inventors: Claudio Matthias Fleiner, San Jose, CA (US); Richard Andrew Golding, San Francisco, CA (US); Deepak R. Kenchammana-Hosekote, San Jose, CA (US); Omer Ahmed Zaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 12/061,892

(22) Filed: Apr. 3, 2008

(65) Prior Publication Data
US 2008/0195813 A1 Aug. 14, 2008

Related U.S. Application Data

(63) Continuation of application No. 11/846,046, filed on Aug. 28, 2007, which is a continuation of application No. 10/977,429, filed on Oct. 29, 2004, now Pat. No. 7,318,119.

(51) Int. Cl.
*G06F 12/16* (2006.01)
*G06F 13/00* (2006.01)
(52) U.S. Cl. .................. 711/114; 711/100; 711/154
(58) Field of Classification Search ............... 711/100, 711/111, 112, 114, 154
See application file for complete search history.

(56) References Cited

U.S. PATENT DOCUMENTS

| 6,112,226 | A | * | 8/2000 | Weaver et al. | 709/203 |
| 6,289,356 | B1 | * | 9/2001 | Hitz et al. | 707/201 |
| 2003/0041211 | A1 | * | 2/2003 | Merkey et al. | 711/114 |

* cited by examiner

*Primary Examiner*—Tuan V. Thai
(74) *Attorney, Agent, or Firm*—John L. Rogitz

(57) ABSTRACT

A fault-tolerant and efficient way of deducing a set of inconsistent stripes for a network RAID protocol, wherein clients forward input/output (I/O) to a particular controller device called the coordinator, which executes RAID logic and which sends out device IOs to the relevant storage devices. If the coordinator fails then a new coordinator reconstructs its state from the storage devices.

17 Claims, 5 Drawing Sheets

Host Write Logic

Device Write Logic

Recovery

Recovery

Clearing Tags

SYSTEM AND METHOD FOR FAULT TOLERANT CONTROLLER FOR NETWORK RAID This is a continuation of co-pending U.S. patent application Ser. No. 11/846,046, filed Aug. 28, 2007, which is a continuation of 10/977,429, filed Oct. 29, 2004 (now U.S. Pat No. 7,318,119), from both of which priority is claimed.

I. Field of the Invention

The present invention relates generally to redundant data storage systems such as redundant arrays of independent disks (RAID) systems.

II. Background

RAID systems that span multiple controllers are referred to as "network RAID". The purpose of RAID systems is to provide data redundancy, so that a single RAID module failure will not result in lost data. When a RAID module fails abruptly (either due to software error or hardware failure) it can leave inconsistent parity/mirror stripes, which can be repaired. As recognized herein, however, if these stripes are not repaired before a subsequent failure(s) then data loss will occur.

In many RAID systems, client devices, also referred to herein as "hosts", are connected to multiple storage controllers. Data redundancy is maintained across controllers in accordance with RAID principles, with software being executed on each controller to coordinate layout and access to data and its recovery on component failure. By virtualizing physical storage from these controllers, the software provides shared access to data from multiple clients and allows managing for scaling of capacity, performance, and availability.

As understood herein, a challenge to allowing clients to share access to data is the potential for inconsistent updates to the physically distributed redundant data. Consider a RAID-5 layout for shared data between two clients. When a client wishes to write to a file, the relevant data block as well as the associated parity block must be updated. This operation is done in two phases. In the first phase, the old data and parity is read. In the second phase, the new data and the adjusted parity are written to the storage devices. But if two clients happen to concurrently write, then a wrong interleaving of the two phases of each write can lead to an inconsistent parity, which can occur even when the clients are writing to disjoint logical address ranges. The relationship between data and parity is introduced due to the layout and requires atomic parity update for correctness.

Another source of inconsistent parity occurs when a client fails in the middle of its second phase of a write operation. In that case, it might have sent out a command to write new data but before it can send out the command to write the new parity (or vice versa). In both cases, the end result is that the data and parity blocks are inconsistent. If a storage device in the system fails before this inconsistency is repaired, then data loss will occur.

SUMMARY OF THE INVENTION

A general purpose computer is programmed according to the inventive steps herein. The invention can also be embodied as an article of manufacture—a machine component—that is used by a digital processing apparatus and which tangibly embodies a program of instructions that is executable by the digital processing apparatus to execute the present logic. This invention may be realized in a critical machine component that causes a digital processing apparatus to perform the inventive method steps herein.

The invention is directed to maintaining consistency within a RAID system by serializing writes from multiple clients, and by tracking inconsistent data on failure so that it can be repaired before another failure occurs. Some implementations assume that client IOs are forwarded to a particular controller in the RAID system, referred to herein as the coordinator, which executes updates to the data and parity blocks. A coordinator may be provided for each managed data unit (e.g. file, object, extent) so that the function of serializing requests from clients is spread over all controllers. To track the inconsistent data when a coordinator fails, the storage devices maintain a history (or log) of operations which is read and used by a new coordinator to identify potentially inconsistent data for repair.

Accordingly, a data storage system that defines plural data units such as extents includes plural storage controllers, with a coordinator being instantiated in one of the controllers and implementing logic. The logic can include receiving a write command from a client, appending to the write command data location tags to render at least one tagged device write, and then sending the tagged device write to storage devices for storage of tags. If the coordinator fails, the tags stored in the storage device are used by a substitute coordinator that is instantiated on another storage controller to repair data inconsistencies.

The location tags can represent data storage location information, such as "stripe" and "span", from a RAID client. To reduce the space required to store tags, tags bearing a predetermined relationship to a horizon data element are deleted. The horizon data element may be sent to a controller during a device write or separately from a device write.

In another aspect, a method for promoting fault tolerance in a storage network includes receiving host writes at a coordinator and transforming each host write into plural device writes. Each device write is sent to a respective storage device, and each device write includes tags. In the event of coordinator failure, a substitute coordinator is instantiated, and the tags used to repair data inconsistencies, if any, between controllers by means of the substitute coordinator. Tags are periodically discarded from the controllers.

In yet another aspect, a computer program storage device bears logic that can be executed by a digital processing apparatus. The logic can include means for tagging, with location tags, device writes derived from a host write. The logic can also include means for sending the device writes to respective storage devices. Means are provided for resolving data inconsistencies between at least two storage devices using the tags. Also, means are provided for discarding tags from the storage devices.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
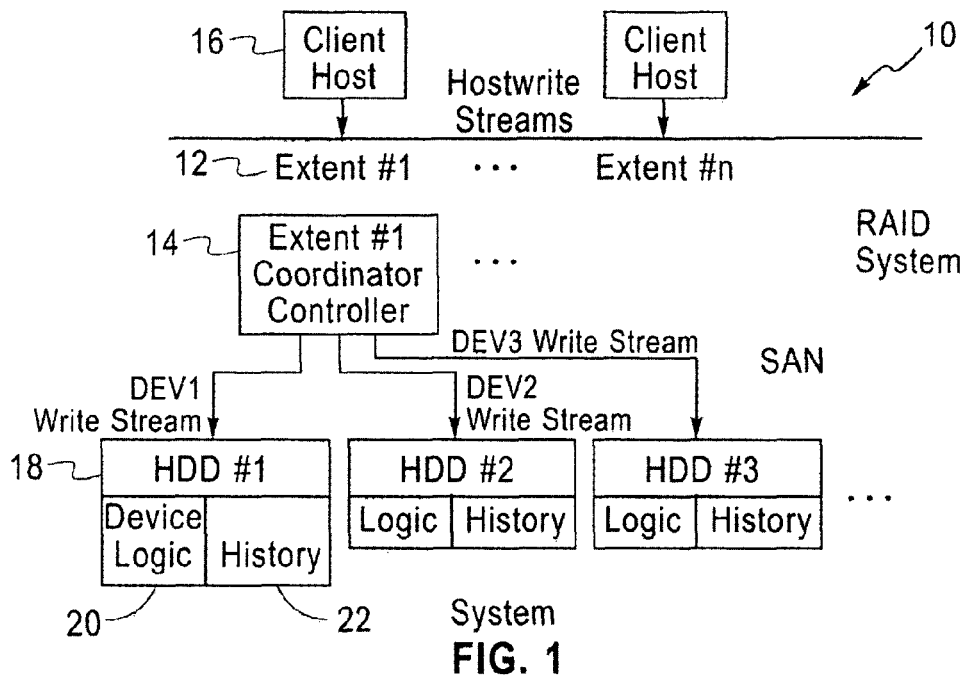
FIG. 1 is a block diagram of the present system.

Referring initially to FIG. 1, a data storage system is shown, generally designated 10, in which large storage volumes such as storage area networks, which may be established by multiple disk drives in a system such as but not limited to a RAID-5 system, are divided into smaller units 12 referred to herein as "extents". As shown, each extent 12 is associated with a respective coordinator 14. All data from plural client host device 16 that is to be stored in the extent managed by a coordinator 14 passes through the coordinator 14. A coordinator 14 may be instantiated by any one of the plural drive controllers associated with respective storage devices 18 (e.g., disk drives) in the extent.

As intended herein, a coordinator 14 serializes all accesses to its associated extent 12, and specifically serializes potentially interfering file updates to physical storage that spans multiple storage devices 18. Also, the coordinator 14 for an extent 12 implements the redundancy, caching, and recovery logic for that extent.

As set forth more fully below, a coordinator's state is recoverable from the states stored at each of the storage devices (e.g., storage devices 18) it manages, so that if the controller on which a coordinator 14 is instantiated fails, then the state (or at least parts of the state that can lead to data loss) of the failed coordinator 14 is recoverable by a new coordinator that is instantiated on another controller. The new coordinator repairs potentially inconsistent data. This way, although a particular instance of a coordinator may fail, almost instantaneously another instance is created that can repair and continue. The invention is applicable to all mirror and RAID layouts, and to any input/output optimizations such as request coalescing, checkerboarding, etc.

As shown in FIG. 1, each storage device 18 includes a device logic module 20 for executing the relevant logic below, and a history object 22 which stores the history of write operations executed by the associated storage device 18. The history object 22 stores three attributes for each operation, namely, the operation's identifier, an offset, and a "span" and/or "stripe" in accordance with disclosure below. The offset and "span/stripe" are opaque to the history object 22 and are not changed by the history object 22. The history object 22 may be stored in non-volatile memory, and can implement the following methods/application programming interfaces (API):

clear( ): initializes/resets the history object add(id, offset, span): appends a write operation with id, offset, and span attributes to its list read( ): returns all entries being held forget(horizon): removes all entries with id<"horizon" (discussed further below)

merge(histories): merges a set of histories and returns the result as a history.

Figure 2:
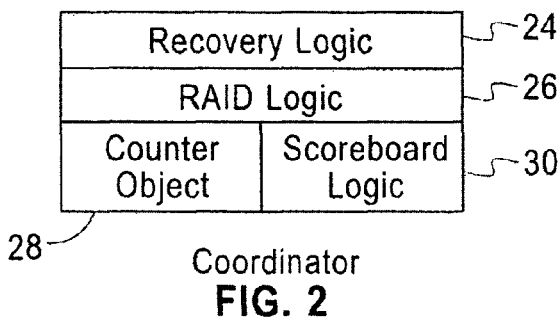
FIG. 2 is a schematic diagram of a coordinator.

Also, as shown in FIG. 2 the coordinator 14 includes recovery logic 24 for executing relevant recovery logic set forth further below in the event of a failure, and RAID logic 26 for distributing data from client hosts 16 (referred to herein as "hostwrites") among the managed controllers, with each data element received being sent to at least two separate storage areas in the extent 12 in accordance with RAID principles known in the art. That is, data in an extent 12 is stored using a redundancy scheme, e.g., mirroring or RAID, over a set of storage devices. The RAID logic 26 also implements parity generation and management in accordance with RAID principles. The coordinator 14 further includes a counter object 28 and a scoreboard object 30.

Hostwrites at the coordinator 14 are serviced in write-back or write-through modes depending on the cache configuration at the coordinator 14. In write-back mode, hostwrite data is held in dirty pages marked for destage to storage devices at a later (idle) time. When dirty pages are destaged, the coordinator 14 translates them into device write data streams, referred to herein as "devwrites" (and device reads if necessary), which are issued to the storage devices 18. A similar case occurs during write-through operations. Hostwrites are translated to devwrites (and devreads if necessary) by the coordinator 14. A hostwrite or devwrite operation has three parameters, namely, logical block address (LBA or offset), the number of blocks to be written (count), and the source or destination data buffers. It is to be understood that fault tolerance of dirty data in the controller cache in write-back mode is beyond the scope of the present invention.

The counter object 28 generates (strictly) monotonically increasing tokens, which can be, e.g., 16-bit or 32-bit or 64-bit, from an atomically incremented variable and to this end the counter object 28 may have a lock and space. The counter object 28 can have the following methods/API:

clear( ): initializes/resets the counter object read( ): returns the token which is an atomic increment of the internal variable set(value): atomically sets the internal variable to "value".

The scoreboard object 30 in, e.g., volatile memory of the coordinator 14 keeps track of operations that are currently in progress. It relies on operations having (strictly) monotonically increasing identifiers (id), derived from the tokens produced by the counter object 28. The scoreboard object 30 maintains a boolean flag encoding the completion status of each operation. Whenever an operation is completed, the flag for that operation is set to true. The non-limiting scoreboard object 30 may be designed to return the highest id such that there is no $id_i \leq id$ whose completion flag is false. This id is referred to as the minimum or "min" of the scoreboard object 30. To reduce memory requirements, all entries with id<min can be discarded from the scoreboard object 30. A scoreboard object 30 may have the following methods/API:

clear( ): initializes/resets the scoreboard object add(id): adds an operation having an identification "id"

done(id): generates notification that operation with "id" has been completed min( ): returns the current min If desired, in addition to operational codes such as WRITE and READ, a "READ_HISTORY" code can be implemented to retrieve the history at a storage device in accordance with logic below. Also, a "CLEAR_HISTORY" code can be implemented to clear out history at the storage device.

FIGS. 3-8 show logic in accordance with the present invention. With respect to the present logic, which may be executed by the coordinator 14 and storage devices 18, the flow charts herein illustrate the structure of the present logic as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the flow charts may be embodied in a computer program that is executed by a processor as a series of computer-executable instructions. These instructions may reside, for example, in a program storage device of the system 10. The program storage device may be RAM, or a magnetic or optical disk or diskette, magnetic tape, electronic read-only memory, or other appropriate data storage device. In an illustrative embodiment of the invention, the computer-executable instructions may be lines of compiled C/C++ compatible code. In FIGS. 4-8, round edged rectangles are action states, while straight edged rectangles represent blocking states.

Figure 3:
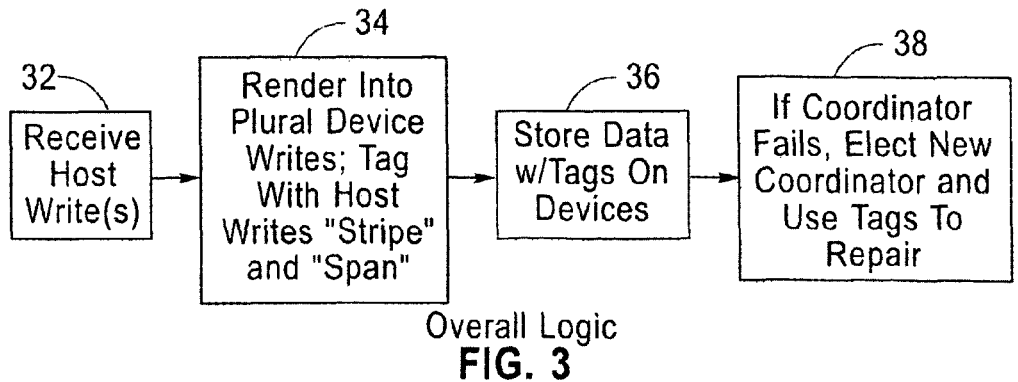
FIG. 3 is a flow chart of the overall logic.

Now referring to the overall logic illustrated in FIG. 3, host writes are received by the coordinator 14 at block 32, which serializes host writes from multiple clients. At block 34, the host write is rendered into plural redundant device writes in accordance with redundant data storage principles known in the art. As part of the process at block 34, data location tags that can represent, e.g., stripe and span information are appended to each device write for storage of the tags in the relevant storage devices 18. When implemented as a "RAID" system a "stripe" can mean the set of pages on disks in a RAID that are the same relative distance from the start of the disk drive. A "span", on the other hand, can mean the number of (typically contiguous) stripes that the write operation overlaps.

Block 36 indicates that the device write data along with the tags are stored on the storage device 18 being written to. At block 38, if the coordinator 14 fails, another coordinator is instantiated on one of the storage devices 18 in the extent 12 (by, e.g., "electing" the most lightly loaded storage device) and the tags are used in accordance with the logic below to repair any data inconsistencies that might exist between storage devices. As also set forth further below, tags are periodically discarded from the storage devices 18.

Figure 4:
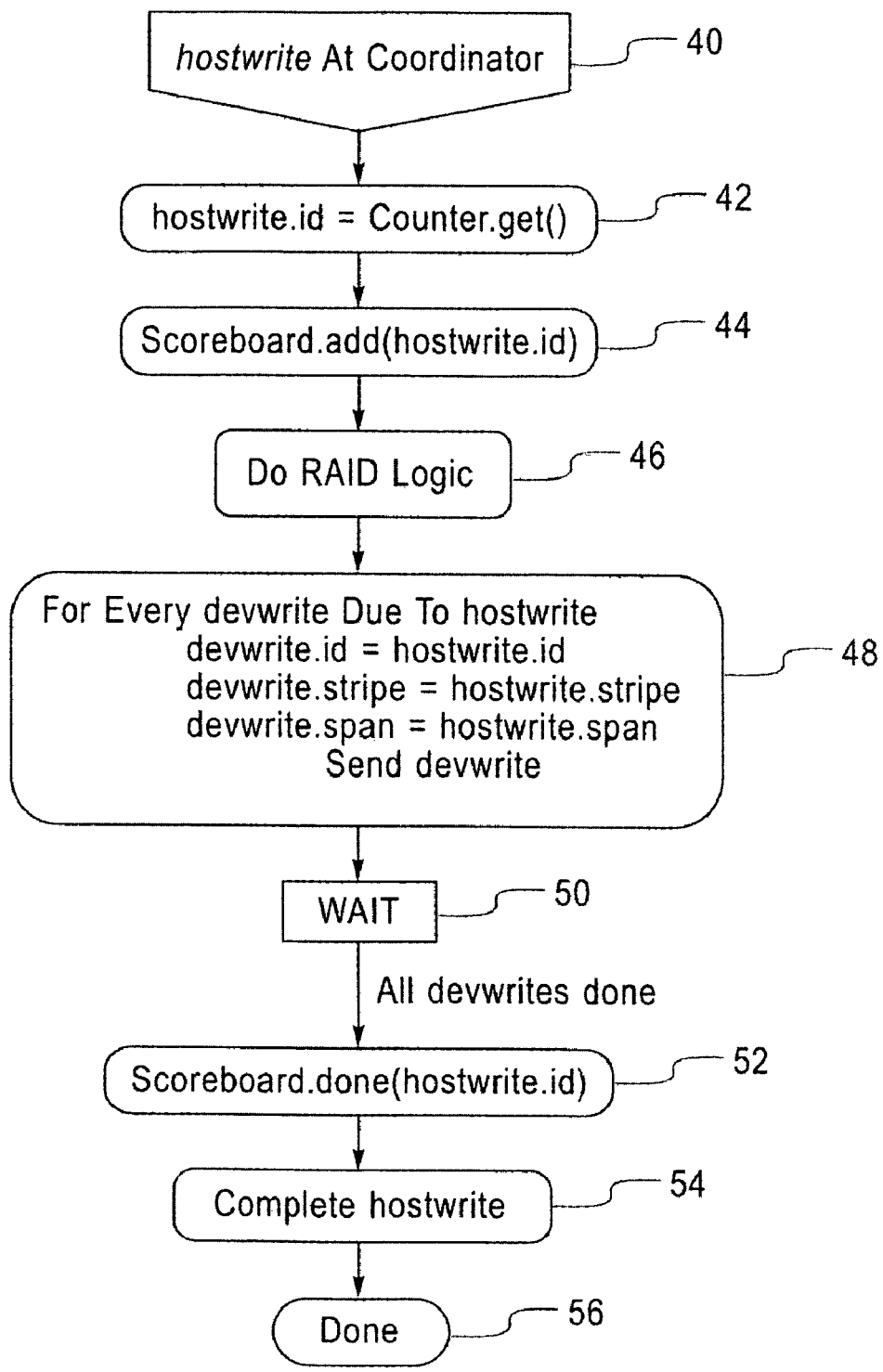
FIG. 4 is a flow chart of the host write logic.

Details of preferred non-limiting logic can be seen in reference to FIGS. 4-8. FIG. 4 shows the logic invoked by the coordinator 14 for executing a host write ("hostwrite") as indicated at state 40. At state 42 the current hostwrite identification is set equal to the current identification value in the counter object 28 of the coordinator 14. Proceeding to state 44, the current hostwrite identification is added to the scoreboard object 30, and then at state 46 RAID logic is undertaken to generate plural (e.g., three) streams of redundant data ("device writes", or "devwrites" for short) in accordance with RAID principles known in the art.

State 48 indicates that each devwrite, in addition to the write parameters of logical block address (LBA) and data count, includes stripe and span tags, and more particularly that devwrite.id, devwrite.stripe, and devwrite.span parameters are set equal to the corresponding values from the host write. The device writes are sent to their respective storage devices 18, and state 50 indicates that the process waits until all devices are done, at which point the scoreboard object 30 is updated accordingly at state 52 and the hostwrite completed at state 54 before ending at state 56.

Figure 5:
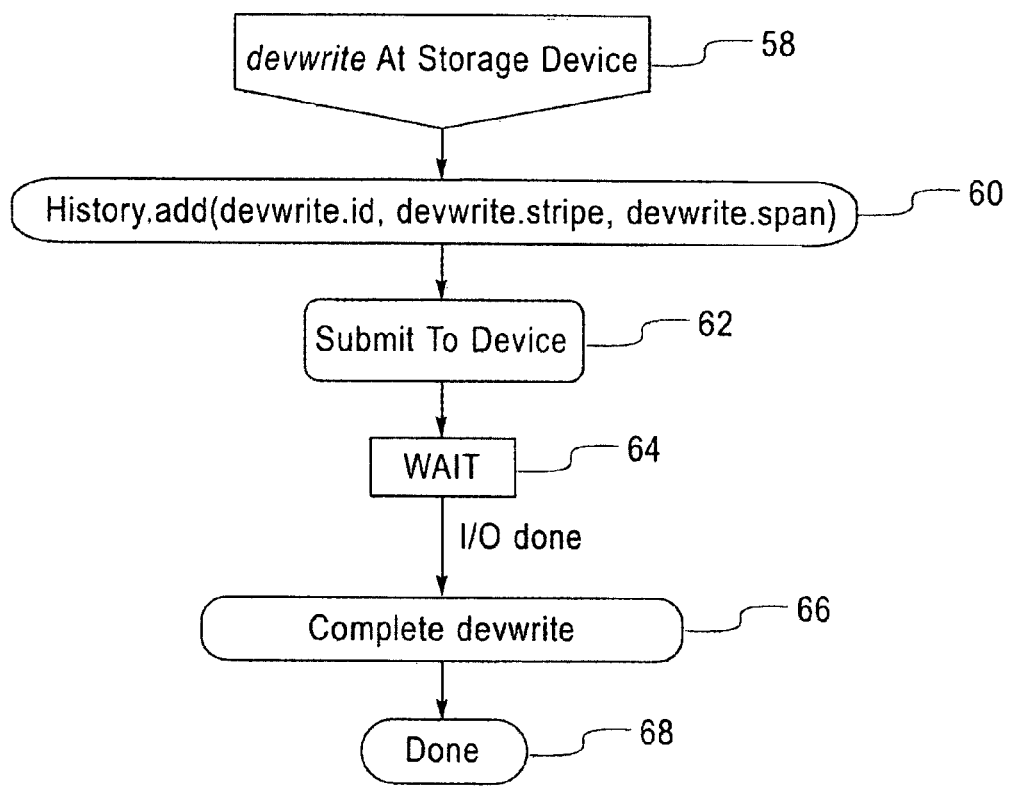
FIG. 5 is a flow chart of the device write logic.

FIG. 5 shows the logic executed by a storage device 18 as indicated at state 58 in response to the logic discussed above in relation to FIG. 4. At state 60, the devwrite.id, devwrite.stripe, and devwrite.span parameters are stored in the history object 22 of the storage device 18. The history object 22 may be implemented in main memory of the device, or on disk, or cached. At state 62 the data to be written is submitted to the storage device. Block 64 indicates that the logic pauses until the requested write is complete, at which time the logic flows to state 66 to indicate a completed device write prior to ending at state 68.

Figure 6:
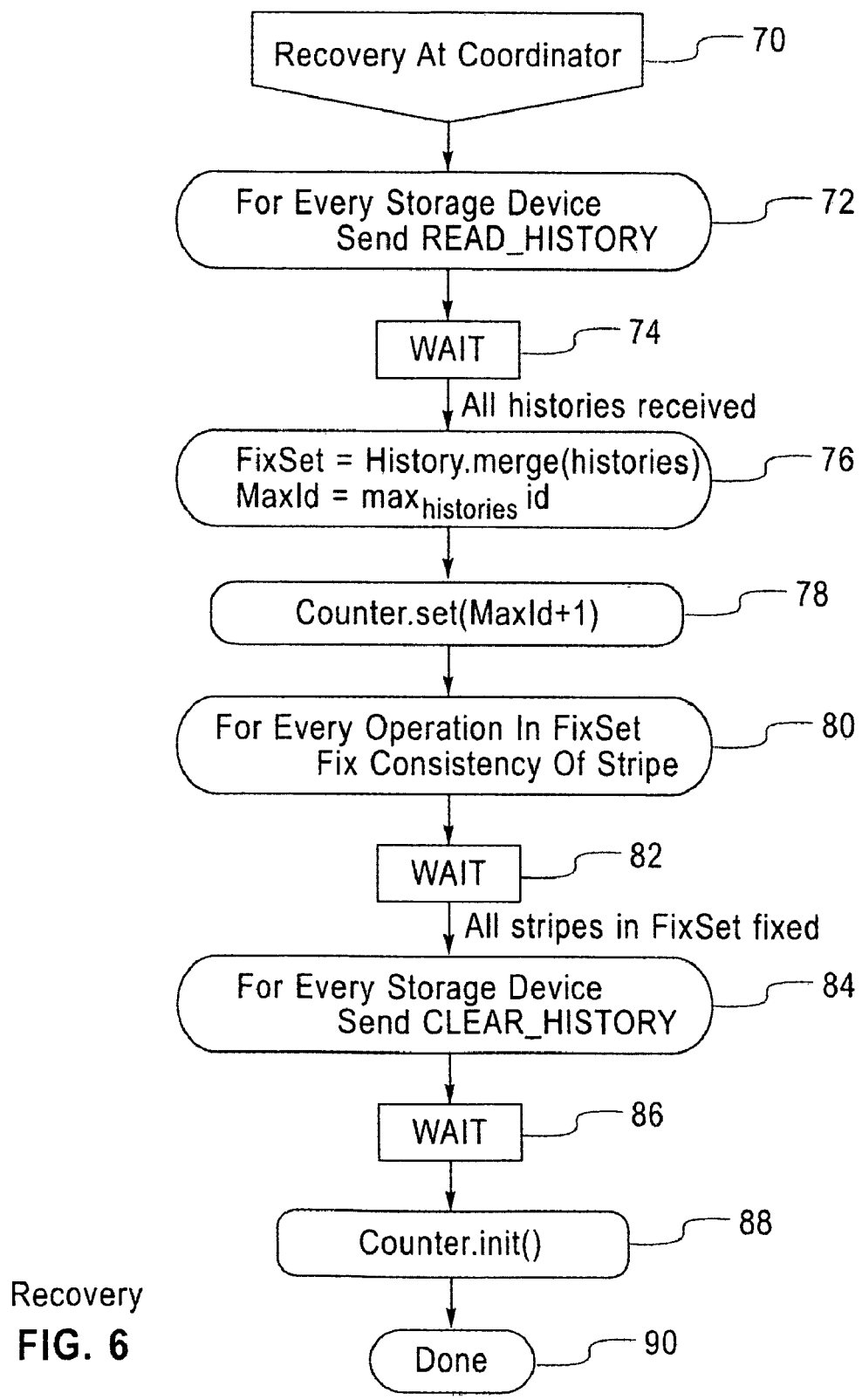
FIG. 6 is a flow chart of the recovery logic at a new coordinator.

State 70 in FIG. 6 indicates that FIG. 6 shows the logic that is executed at the coordinator of the present invention for recovering from a fault, such as the loss of a coordinator, it being assumed that a substitute coordinator is immediately instantiated in one of the controllers associated with the storage devices 18 of the extent 12. At state 72 each storage device 18 sends its read history (i.e., its tags) to the new coordinator.

Block 74 indicates that the process waits until all histories in the extent 12 are received, at which time the histories are merged at state 76 and the parameter "MaxID" is set equal to the maximum of the id's received in the accumulated histories. Proceeding to state 78, the value in the counter object 28 of the coordinator 14 is set equal to the parameter "MaxID" plus one. The step at state 78 during the merging of histories is necessary to ensure idempotency of the recovery logic. Until the command CLEAR_HISTORY is sent as discussed further below, the counter is approximately set to the value at the failed coordinator.

Moving to state 80, for every operation in the set of operations that are suspected of containing faults, e.g., every operation that had not been completed prior to the failure, the consistency of the corresponding RAID stripe is repaired using parity and repair principles known in the art for repairing inconsistent data. To this end, the tags received pursuant to state 72 are used to identify and repair data elements from various storage devices 18 that are correlated to each other, i.e., that are redundancies of each other. Stated differently, data elements having the same stripe and/or span tags should be consistent with each other, and if they are not, the inconsistencies are identified thereby.

Block 82 indicates that the process continues until all affected stripes are repaired, at which point the logic flows to state 84, wherein a "clear history" command is sent to each storage device 18 in the extent 12, which clears its history object 22 in response. The logic waits at state 86 until the clearance is complete, at which point it flows to state 88 to reinitialize the counter object 28 prior to ending at state 90.

Figure 7:
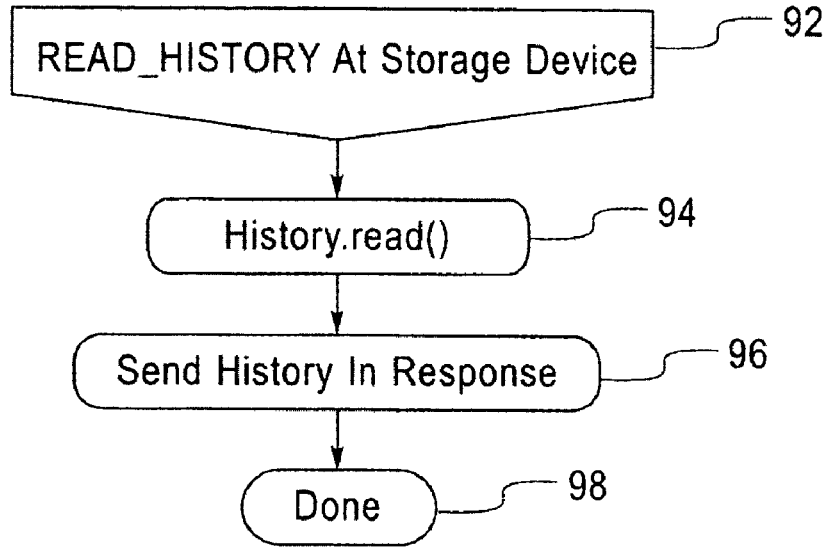
FIG. 7 is a flow chart of the recovery logic at a storage device.

State 92 in FIG. 7 indicates that FIG. 7 shows the logic that is executed at a storage device 18 for recovering from a fault. Proceeding to state 94 the data in the history object 22 is read, and at state 96 the data is sent to the coordinator 14 in response. The logic ends at state 98.

Figure 8:
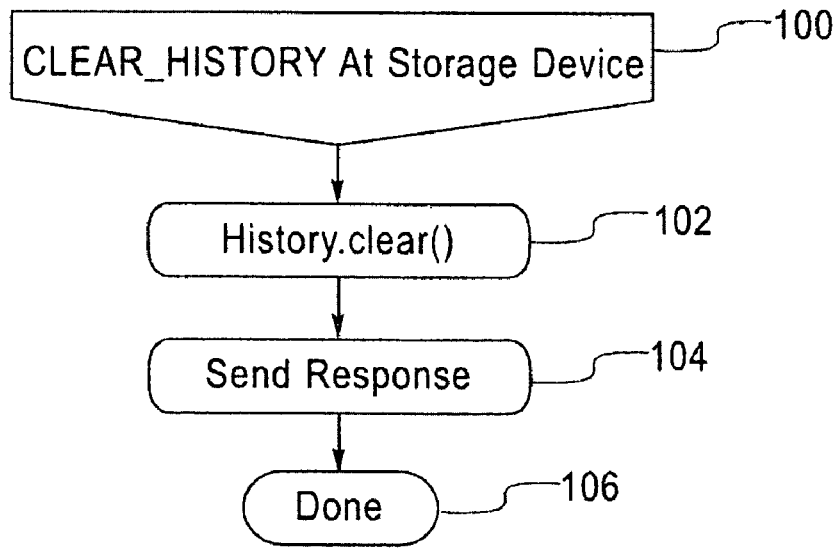
FIG. 8 is a flow chart of the logic for clearing tags.

As stated previously, to avoid the consumption of too much storage space in the storage devices 18 owing to the accumulation of tags, FIG. 8 shows that the history object 22 of a storage device 18 can be cleared. History is cleared at state 102 and a response sent to the coordinator at state 104, prior to ending at state 106.

In accordance with the present invention, history may be cleared by sending to the devices 18 a "horizon", i.e., a tag identification or time, tags earlier than which can be discarded. In one approach, the horizon is sent to devices on devwrite operations. Alternatively, a timer thread at the coordinator 14 can periodically send the horizon to the devices 18 as a separate command/message.

While the particular SYSTEM AND METHOD FOR FAULT TOLERANT CONTROLLER FOR NETWORK RAID as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A data storage system defining plural data units, comprising:
   plural storage controllers in at least one data unit, a coordinator being instantiated in one of the controllers, the coordinator implementing logic comprising:
   receiving at least one write command representing data from a client;
   appending, to the data, data location tags to render at least one tagged device write;
   sending the tagged device write to at least one storage device for storage of at least some tags, wherein if the coordinator fails, the tags stored in the storage device are used by a substitute coordinator instantiated on a storage controller in the data unit to repair at least one data inconsistency, wherein the data location tags represent data storage location information indicating storage medium location of the data to which the tags are appended.

2. The system of claim 1, wherein the location tags represent stripe location.

3. The system of claim 1, wherein the location tags represent span location.

4. The system of claim 1, wherein the system is implemented in a RAID system.

5. A method for promoting fault tolerance in a storage network, comprising:
   receiving host writes at a coordinator;
   transforming each host write into plural device writes, each device write being sent to a respective storage device, each device write including at least one tag indicating a disk location that is the target of the device write;
   in the event of coordinator failure, instantiating a substitute coordinator; and
   using the tags to repair data inconsistencies, if any, between controllers by means of the substitute coordinator.

6. The method of claim 5, wherein the coordinator serializes host writes from multiple clients.

7. The method of claim 5, wherein the tags represent data storage location information from the client.

8. The method of claim 5, wherein the location tags represent stripe location.

9. The method of claim 5, wherein the location tags represent span location.

10. The method of claim 5, wherein the method is implemented in a RAID system.

11. A computer program storage device bearing logic executable by a digital processing apparatus, comprising:
    means for tagging, with location tags indicating storage medium locations at which respective device writes are to be executed, device writes derived from a host write;
    means for sending the device writes to respective storage devices; and
    means for resolving data inconsistencies between at least two storage devices using the tags.

12. The computer program storage device claim 11, comprising means for serializing host writes from multiple clients.

13. The computer program storage device claim 11, wherein the tags represent data storage location information from the client.

14. The computer program storage device claim 11, wherein the location tags represent stripe location.

15. The computer program storage device claim 11, wherein the location tags represent span location.

16. The computer program storage device claim 11, wherein the means are implemented in a RAID system.

17. A method for promoting fault tolerance in a storage network, comprising:
    receiving host writes at a coordinator;
    transforming each host write into plural device writes, each device write being sent to a respective storage device, each device write including at least one tag;
    in the event of coordinator failure, instantiating a substitute coordinator;
    using the tags to repair data inconsistencies, if any, between controllers by means of the substitute coordinator; and
    periodically discarding tags from the controllers, wherein the coordinator serializes host writes from multiple clients, the tags represent data storage location information from the client, the tags representing stripe and span location, wherein a coordinator invokes a host write, a current hostwrite identification being set equal to a current identification value in a counter object of the coordinator, the current hostwrite identification being added to a scoreboard object, logic being undertaken to generate plural streams of redundant data ("devwrite"), each devwrite, in addition to write parameters of logical block address (LBA) and data count, includes stripe and span tags.

* * * * *